No. 12,049. Reissued Oct. 28, 1902.

W. BUTTLER.

APPARATUS FOR THE MANUFACTURE OF HOLLOW GLASS ARTICLES.

(Application filed July 5, 1901.)

WITNESSES

Warren W. Swartz

Geo. B. Bleming

INVENTOR

William Buttler by Bakewell & Byrne his attys.

UNITED STATES PATENT OFFICE.

WILLIAM BUTTLER, OF REDKEY, INDIANA.

APPARATUS FOR THE MANUFACTURE OF HOLLOW GLASS ARTICLES.

SPECIFICATION forming part of Reissued Letters Patent No. 12,049, dated October 28, 1902.

Original No. 645,787, dated March 20, 1900. Application for reissue filed July 5, 1901. Serial No. 67,231.

*To all whom it may concern:*

Be it known that I, WILLIAM BUTTLER, of Redkey, in the county of Jay and State of Indiana, have invented a new and useful Improvement in Apparatus for the Manufacture of Hollow Glass Articles, of which the following is a full, clear, and exact description, reference being had to the accompanying drawings, forming part of this specification, in which—

Figure 1:
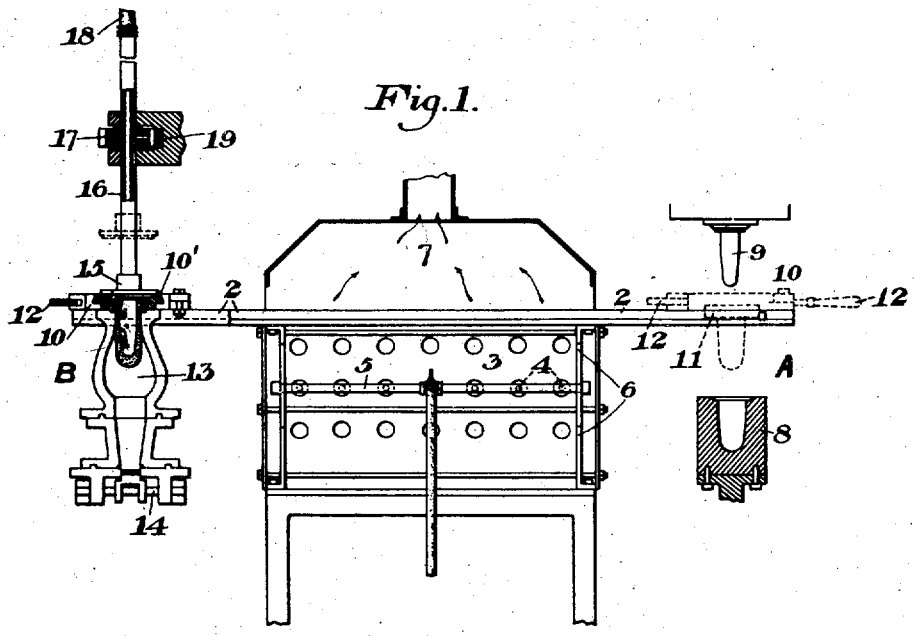
Figure 2:
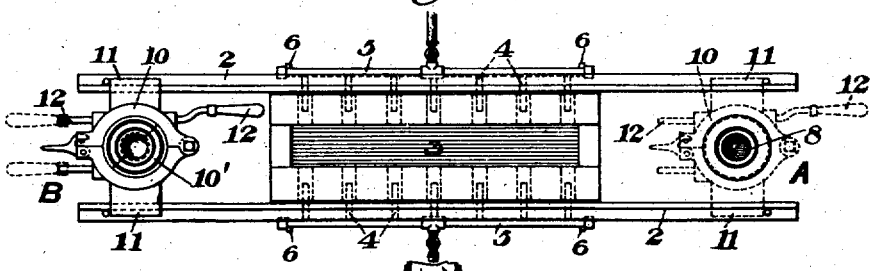
Figure 3:
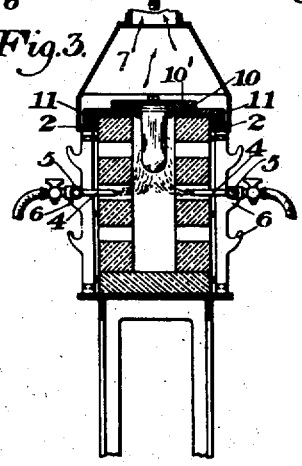

Figure 1 is a sectional side elevation of apparatus embodying my invention. Fig. 2 is a top plan view of the same, and Fig. 3 is a vertical cross-section through the reheating-furnace.

My invention relates to the manufacture of hollow glass articles by pressing a blank and then blowing this pressed blank; and its objects are to improve the quality of articles thus made, to enable the pressed blank to be elongated without mechanical means therefor, and to give the blank a better surface. Heretofore the pressed blank whose surfaces have been chilled by contact with the mold and plunger has been taken directly to the blow-mold, and this chilling of the surfaces of the pressed blank interferes materially with its elongating and proper shaping by the blowing operation and also prevents the formation of an article having the desired surface finish.

My invention overcomes this difficulty; and it consists in using transfer mechanism which carries a mold-ring with a blank therein from a pressing apparatus to a blowing apparatus and a furnace or source of heat in the path of the transfer mechanism and arranged to heat at least a portion of the blank before blowing or expanding.

It also consists in the mechanism hereinafter more fully described, and set forth in the claims.

In the drawings, 2 2 represent rails of a horizontal track, which lead from a pressing-station A to a blowing-station B. Intermediate of the length of this track is placed a reheating-furnace 3, which is open at its top and is provided with side openings, into which project burners 4, secured to supply-pipes 5, which may be supported in different positions by sets of lugs 6, located in pairs at different levels on the sides of the furnace. This furnace is preferably provided with a sheet-metal hood 7, which may be arranged so as to be easily removable.

At the pressing-station, 8 represents a press-mold, which may be supported on a hydraulic or other plunger, and 9 is the mold-plunger, which may be similarly carried. The mold and its plunger are simultaneously moved toward and from each other by the cylinders or any other suitable mechanism.

10 is a mold-ring made in two parts and having lateral wings 11, which are flanges, so as to rest upon and be moved along the track.

10′ is a rotatory ring carried in the two-part mold-ring. This mold-ring may be provided with suitable handles 12 for opening or closing and for moving it along the track.

At the blowing-station, 13 represents a blow-mold, which I have shown as made of two parts, which are hinged at the bottom to a common shaft 14; but any desired form of blow-mold may of course be used.

15 is a rotary blow-head, which is beveled to engage the correspondingly-beveled recess in the upper face of the rotary ring 10′ and is secured to rotary shaft 16, having a key connection with a pinion 17. Above the pinion the hollow shaft connects with a flexible air-supply tube 18. The pinion may be actuated by a rack 19 or in any other desired manner.

In using my improved apparatus a suitable quantity of hot glass being dropped into the press-mold this mold and its plunger are moved toward each other and meet at the mold-ring, which has been brought to the proper point between them. The plunger and mold then being simultaneously retracted, the mold-ring, with the blank depending therefrom, is moved along the track, the blank passing through the reheating-furnace, the chilled surface being thus brought to the proper temperature. The mold-ring being thus brought to the proper point at the blowing-station, the blow-mold is closed about it and the blow-head being rotated is forced down against the mold-ring, so as to rotate the inner rotary ring portion thereof. The blank is thus rotated or oscillated during the blowing operation, and a seamless article is obtained.

The advantages of my invention result from

WEST VAYLVANE CORP.

the reheating of the pressed blank before blowing it, since a much better article is afforded and one having a finer surface, and the elongating action is easily and completely effected in the blowing operation.

Many different forms of apparatus may be designed by the skilled mechanic without departing from my invention, since

I claim—

1. In apparatus for forming hollow glass articles, a pressing apparatus, a blowing apparatus, a movable mold-ring, transfer mechanism arranged to carry the mold-ring and blank from the pressing apparatus to the blowing apparatus, and a furnace in the path of the transfer mechanism, and arranged to reheat at least a portion of the blank before blowing; substantially as described.

2. In apparatus for forming hollow glass articles, a pressing apparatus, a blowing apparatus, a track extending between them, a mold-ring movable along the track, and arranged to transfer the pressed blank to the blowing apparatus, and a furnace intermediate of the length of the track, and arranged to heat at least a portion of the blank before blowing it; substantially as described.

3. In apparatus for forming hollow glass articles, a track, a mold-ring movable upon the track, pressing apparatus at one point along the track arranged to press a blank and secure it to the mold-ring, mechanism for blowing the pressed blank located at another point along the track, and an intermediate slotted furnace through which the blank passes as the mold-ring is moved along the track; substantially as described.

4. In apparatus for forming hollow glass articles, a pressing apparatus, a blowing apparatus, a movable mold-ring, transfer mechanism arranged to carry the mold-ring and the blank from the pressing apparatus to the blowing apparatus, the blowing apparatus including a blow-head, mechanism for rotating the blow-head and mold-ring during the blowing operation, and a furnace in the path of the transfer mechanism and arranged to heat at least a portion of the blank before blowing; substantially as described.

5. The combination with a track, of a hollow slide movable thereon, and a mold-ring revolubly mounted on the slide; substantially as described.

6. The combination with a track, of a ring-shaped support movable thereon, a mold-ring revolubly mounted on the support, and a blow-head arranged to turn the mold-ring; substantially as described.

7. In apparatus for forming hollow glass articles, a pressing apparatus, a blowing apparatus, a support, a mold-ring revolubly mounted on the support, and transfer mechanism arranged to carry the support and ring from the pressing to the blowing apparatus; substantially as described.

8. In apparatus for forming hollow glass articles, a pressing apparatus, a blowing apparatus, a support movable from the pressing apparatus to the blowing apparatus and carrying a mold-ring revolubly mounted therein, and a blow-head arranged to turn the mold-ring at the blowing-station; substantially as described.

9. The combination with a blow-mold, of a mold-ring carried thereon, a ring rotatably carried by the mold-ring, a blow-head movable toward and from the blow-mold and adapted to seat on the rotatable ring and having a clutch connection therewith, and connections for turning the blow-head and rotatable ring during the blowing operation; substantially as described.

10. In apparatus for forming hollow glass articles, a pressing apparatus, a blowing apparatus, a support arranged to be moved from the pressing apparatus to the blowing apparatus, and having a mold-ring revolubly mounted thereon, a blow-mold and a blow-head at the blowing-station movable toward and from each other, and a clutch connection between the blow-head and the mold-ring arranged to turn the mold-ring at the blowing-station; substantially as described.

11. The combination with a mold of a ring carried thereby, the mold and ring being freely removable from each other so as to permit of the withdrawal of the one from the other, and mechanism for rotating at least one of said elements; substantially as described.

12. The combination of a press-mold, a mold-ring, mechanism for pressing a blank in the mold-ring and press-mold, a separate blow-mold in which the pressed blank carried by the mold-ring may be inserted, and mechanism for rotating the article during its expansion in the blow-mold; substantially as described.

13. The combination of a press-mold, a mold-ring, and a blow-mold adapted to rotatably carry the mold-ring; and mechanism for rotating the mold-ring when thus carried; substantially as described.

In testimony whereof I have hereunto set my hand.

WILLIAM BUTTLER.

Witnesses:
GEO. B. BLEMING,
L. M. REDMAN.